Oct. 29, 1935.  R. MONHEIM  2,019,268
MACHINE FOR THE DELIVERY OF TOKENS
Filed Sept. 21, 1931  3 Sheets-Sheet 1
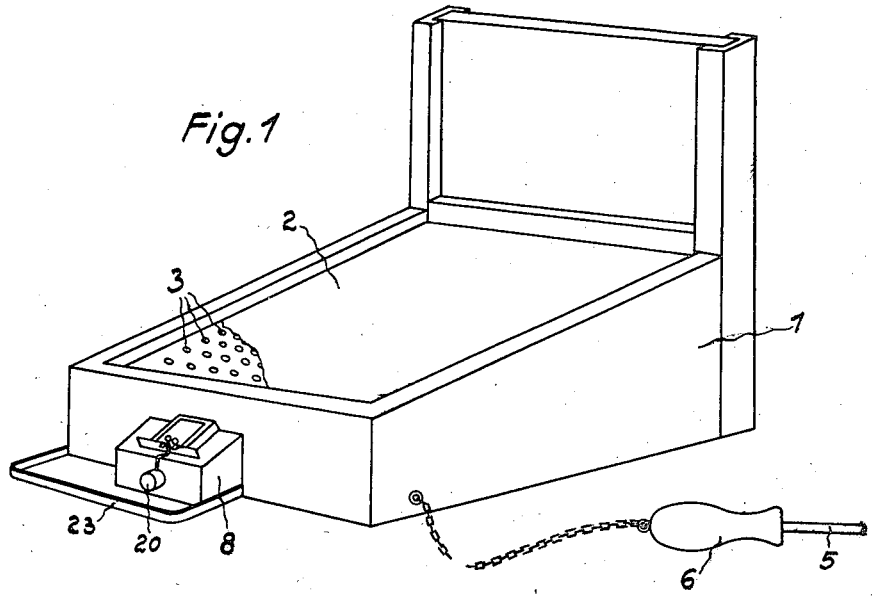
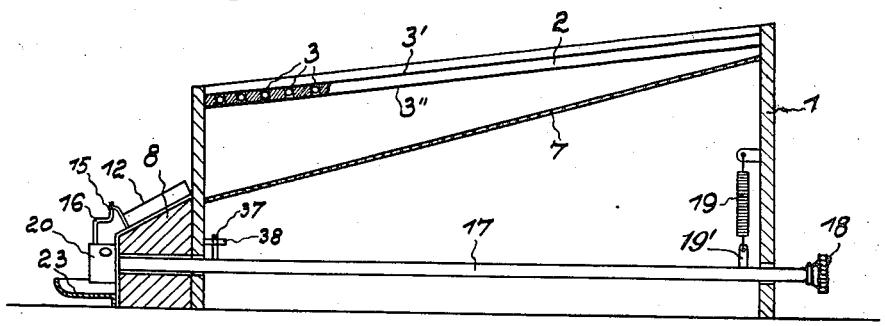
Inventor
Richard Monheim
by C. P. Goepel
his attorney Oct. 29, 1935.  R. MONHEIM  2,019,268
MACHINE FOR THE DELIVERY OF TOKENS
Filed Sept. 21, 1931  3 Sheets-Sheet 2

Inventor
Richard Monheim
by C. P. Goepel
his attorney

Oct. 29, 1935.    R. MONHEIM    2,019,268
MACHINE FOR THE DELIVERY OF TOKENS
Filed Sept. 21, 1931    3 Sheets-Sheet 3

Inventor
Richard Monheim
by C. P. Goepel
his attorney

Patented Oct. 29, 1935

2,019,268

UNITED STATES PATENT OFFICE 2,019,268

MACHINE FOR THE DELIVERY OF TOKENS

Richard Monheim, Berlin-Weissensee, Germany

Application September 21, 1931, Serial No. 564,180
In Germany August 7, 1931

17 Claims. (Cl. 273—139)

My invention relates to machines for the delivery of tokens, and more particularly to machines of the type including a punch board in which an object—which will be referred to as "the token" for the sake of brevity—invisible to the buyer and related by its colour, shape, or other characteristics, to one of the articles, or class of articles, to be vended, is liberated by the buyer and becomes visible. The article, or an article of the class, related to the token is then handed to the buyer who pays the price for it, or is returned to the machine.

It is an object of my invention to improve a machine of this general type.

The present preferred embodiment is a device for the release of tokens forming the equivalent of the goods to be sold and which can be placed in a storage container such as a punch board. The tokens in the present case, balls in this board, are invisible and are punched through the board and fall on an inclined surface from which they roll into a cage. The ball is visible to the buyer when it is in the cage.

To this end, I provide a cage in which the token is temporarily arrested, and means for delivering it from the cage.

To the same end, and particularly with the object of preventing altercations as to which token was the last to be delivered, I provide a trap in combination with the aforesaid cage in which the token after having been delivered by the cage, is arrested until released by means operatively connected to the means by which the token is delivered from the cage.

In the accompanying drawings a machine having a cage for immediate delivery of the marks, and a trap in combination with the cage, are illustrated by way of example.

In the drawings

Fig. 1 is a perspective illustration,

Fig. 2 is a transverse section of a machine,

Figure 3:
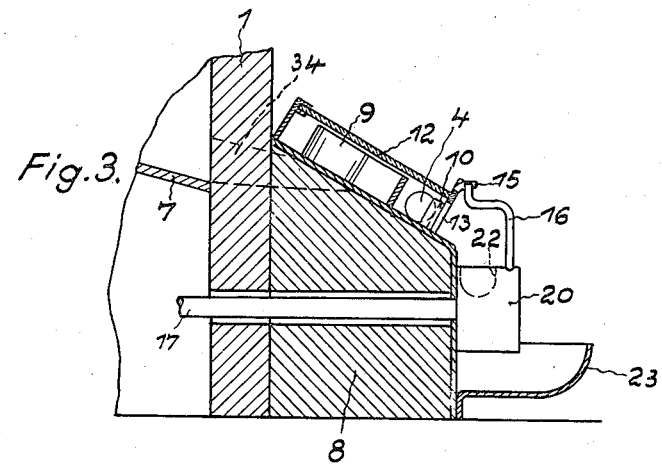
Fig. 3 is a section on the line III—III in Fig. 4, showing its cage drawn to a larger scale.

Referring now to the drawings, and first to Figs. 1 to 5, the casing 1 of the machine is here shown as a pulpit-like structure but obviously may be of any other desired shape. 2 is a plate or holder for the tokens, with holes 3 for their reception, and covering layers 3' and 3" above and below the holes 3 which may be of paper or other readily pierced material, and 5 is a punch, with a handle 6, for piercing the layers and liberating one of the tokens. The tokens are here shown as balls 4, Figs. 3 and 4, but may be of any other regular or irregular configuration, such as cylinders, rollers, bars, cones, cubes and the like. The shape or colour, or any other characteristic of the tokens, defines their relation to a given article, or class of articles and is associated with the different prices thereof.

The buyer, by means of the punch 5, pierces the layer 3' and delivers the token in one of the holes 3. The liberated token drops onto an inclined bottom plate or chute 7 which directs it to a passage 34, Fig. 3, and finally to a race 9 in the cage 8. The cage is preferably arranged in an inclined position so as to be conveniently positioned for the inspection of the buyer who will normally be standing. 12 is a cover of glass or other transparent material on the cage. 10 is a plate at the lower end of the cage which the ball 4 strikes as it leaves the race 9, and 11 is a check at one end of the plate 10 which retains the ball for the present in a position in which it is plainly visible through the cover 12.

Figure 4:
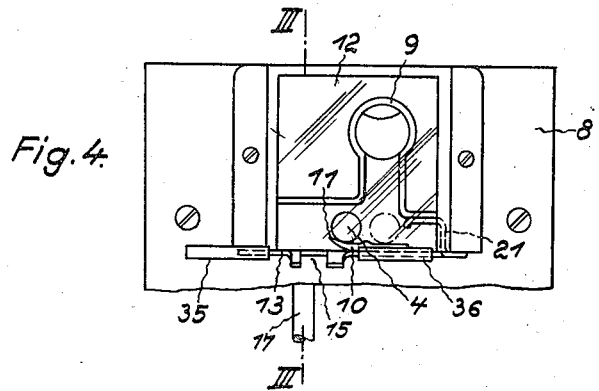
Fig. 4 is a plan view of the cage.
Figure 5:
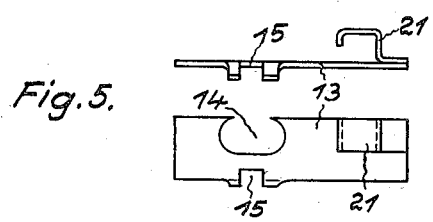
Fig. 5 shows in elevation and plan view the feeding and delivery slide of the cage.

Mounted to slide in guides 35 and 36 at the lower end of the cage is a gate 13, Fig. 5, with a ball-feeding hook 21 at one end and a slot 14 and a fork 15 near its other end. The normal position of the gate 13 is shown in Fig. 4 where the inner end of hook 21 is flush with the corresponding side wall of the race 9.

17 is a driving shaft, Fig. 2, which is mounted to rotate in the casing of the machine below the inclined bottom plate or chute 7, with a handle 18 at one end, a boss 20 at the other, a spring 19, and arm 37 and a check 38 for limiting the rotation imparted to it by the spring 19. 16 is a lever on the boss 20 which engages in the fork 15 on the gate 13, and 22 is a ball-receiving depression in the boss 20. Spring 19 is in connection with a stud 19' projecting from shaft 17 and upon rotation of said shaft, the spring is under tension. By releasing the shaft handle, said spring resumes its normal position and in doing so moves the shaft to contact with arm 37.

In operation, the first ball which has a characteristic colour, or other distinguishing feature denoting a certain price for an article to be sold, is liberated from board 2 by the operator or seller himself with the punch 5 and the buyer who comes first may, if he desires, select the article associated with this particular ball. The ball is arrested by the check 11 as shown in full lines in Fig. 4. If the first buyer does not elect to buy the article represented by the token punched by the seller, he is entitled to liberate a second ball by the punch 5, in which case he must pay the price for the article indicated by the second token. In other words, it is to be noted that the buyer has the opportunity of trying for one or two tokens or balls. If he tries for the two tokens he must pay for the price indicated by the second token or ball, thus taking a chance regarding the price of the article for which he is to pay. This second ball assumes the position shown in dotted lines in Fig. 4 at the side of the first ball. The shaft 17 is now rotated and the first ball is moved across the check 11 and delivered through the slot 14 in the gate 13 while the second ball moves into its position. The depression 22 in the boss 20 is not indispensible but is preferably provided. It receives the discharged ball and delivers it to a bowl 23. The buyer may take the ball from the bowl.

The machine described may be modified in various ways. Thus, the means for supporting the balls or tokens may be a hopper, or other suitable receptacle such as a funnel from the lower end of which they are delivered to the race.

Figure 6:
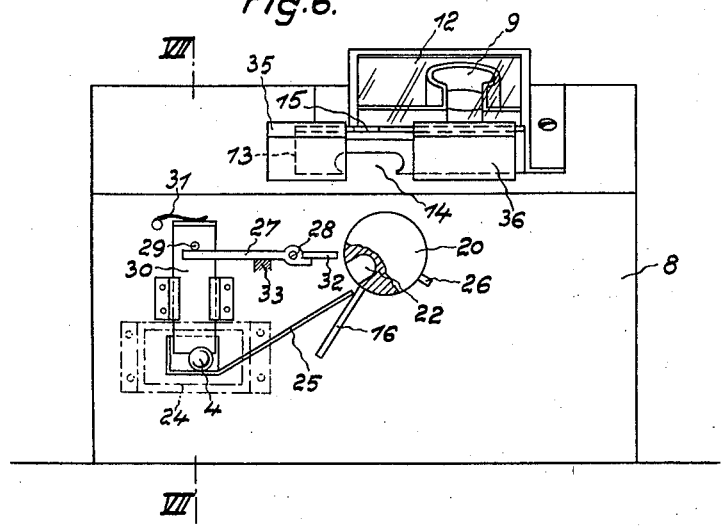
Fig. 6 is an elevation of a cage combined with a trap.
Figure 7:
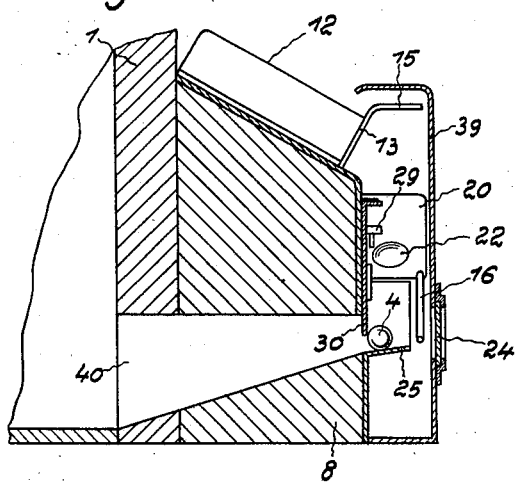
Fig. 7 is a section on the line VII—VII in Fig. 6.

Mistakes or altercations as to which ball or token was delivered to the buyer, are prevented by the trap illustrated in Figs. 6 and 7.

The cage, with its accessories, is designed as described. However, instead of the tray or bowl 23, the ball or mark from the depression 22 in the boss 20 is here delivered to a chute 25 the lower end of which is at the rear of a window or inspection opening 24 in a frame 39. The position of the window or opening 24 is indicated in dot-and-dash lines in Fig. 6. 30 is a gate at the lower end of the chute 25, and 40 is a passage extending from the gate to the casing 1 of the machine. 31 is a spring which tends to close the gate 30, 29 is a pin on the gate, 27 is a lever fulcrumed at 28 which engages below the pin 29, 33 is an abutment for limiting the downward movement of the lever and thereby the closing movement of the gate 30, 32 is a trip at the free end of the lever, and 26 is a pin on the boss 20 for cooperation with the trip 32. The pin 26 is pitched at such an angle in advance of the lever 16, related to the anti-clockwise rotation of the boss 20 on the shaft 17, that the pin 26 strikes the end of the trip 32 and opens the gate 30 to release the ball 4, while the lever 16 is still engaged in the fork 15 of the gate 13 at the cage. This lead of the gate 30 with respect to the gate 13 is necessary for releasing the ball at the lower end of the chute 25 and for returning the gate 30 to closing position, before the next ball is delivered to the chute 25. When the shaft 17 with the boss 20 is rotated clockwise the trip 32 permits the pin 26 to pass without operating the lever 27.

While in this device the balls or tokens are not delivered to the buyer but returned to the casing of the machine, each ball is retained by the trap until the next ball is delivered from the cage, and can be inspected while being retained so that any doubt as to which ball or token was last delivered, is eliminated.

It will be understood from the foregoing description that each ball or token is exposed to view in the cage after its liberation from the plate 3, or the hopper or other receptacle (not shown) replacing it. There will always be at least one token in the cage while the machine is in operation. Each token is delivered or ejected from the cage by the next one, and, as mentioned, the sequence at which the tokens are delivered, may be varied. In any case, however, it will always be apparent which token is delivered to the buyer upon the next operation of the machine.

I claim:

1. In a machine for the delivery of tokens to be exchanged for articles for sale, a holder for a supply of tokens related to the price of the articles to be vended, means for liberating tokens from said holder, a chute for receiving said tokens, a cage connected to the chute in which the liberated tokens are temporarily arrested for inspection, a slidable gate for holding said tokens, and means in connection with the gate for ejecting the tokens from said cage, said ejecting means having a plurality of recesses for accommodating the tokens so that a token is ejected only after another token has been retained in the cage.

2. In a machine for the delivery of tokens to be exchanged for articles for sale, a holder for a supply of tokens related to the price of the articles to be vended, means for liberating tokens from said holder, a cage in which the liberated tokens are temporarily arrested for inspection, and means for ejecting a token from said cage through the medium of a succeeding one.

3. In a machine for the delivery of tokens to be exchanged for articles for sale, a holder for a supply of tokens related to the price of the articles to be vended, means in connection with the holder for liberating tokens from said holder, a chute for guiding the token, a cage at the end of the chute in which the liberated tokens are temporarily arrested for inspection, a grooved check for accommodating and arresting said tokens, and laterally movable means for moving the tokens beyond said check for ejecting them from said cage.

4. In a machine for the delivery of tokens to be exchanged for articles for sale, a holder for a supply of tokens related to the price of the articles to be vended, means in connection with said holder for liberating tokens from said holder, a chute for guiding the tokens, a cage at the end of the chute in which the liberated tokens are temporarily arrested for inspection, and means including a slotted gate with a pusher for ejecting the tokens from said cage.

5. In a machine for the delivery of tokens to be exchanged for articles for sale, a holder for a supply of tokens related to the price of the articles to be vended, means for liberating tokens from said holder, a cage in which the liberated tokens are temporarily arrested for inspection, means including a slotted gate with a pusher for ejecting the tokens from said cage; and a rocking shaft for reciprocating said gate.

6. In a machine for the delivery of tokens to be exchanged for articles for sale, a holder for a supply of tokens related to the price of the articles to be vended, means for liberating tokens from said holder, a cage in which the liberated tokens are temporarily arrested for inspection, and means including a slotted gate with a pusher for ejecting the tokens from said cage, a rocking shaft, and an arm on said rocking shaft engaging said gate.

7. In a machine for the delivery of tokens to be exchanged for articles for sale, a holder for a supply of tokens related to the price of the articles to be vended, normally operable means for liberating tokens from said holder, a cage in which the liberated tokens are temporarily arrested for inspection, and means including a rocking shaft for ejecting the tokens from said cage, and a receptacle for the ejected tokens on said shaft.

8. In a machine for the delivery of tokens to be exchanged for articles for sale, a holder for a supply of tokens related to the price of the articles to be vended, means for liberating tokens from said holder, a cage in which the liberated tokens are temporarily arrested for preliminary inspection, operative means for preliminarily ejecting the tokens from said cage, means for returning the first of the ejected tokens from the cage to the machine, and means operatively connected to said ejecting means for temporarily arresting the ejected tokens in line with a final inspection opening, and for releasing them.

9. In a machine for the delivery of tokens to be exchanged for articles for sale, a holder for a supply of tokens related to the price of the articles to be vended, means for liberating tokens from said holder, a cage in which the liberated tokens are temporarily arrested for preliminary inspection, means for ejecting the tokens from said cage, a chute for receiving the ejected tokens, a gate for arresting them at the lower end of said chute in line with a final inspection opening, and automatic means operatively connected to said ejecting means for controlling said gate.

10. In a machine for the delivery of tokens to be exchanged for articles for sale, a holder for a supply of tokens related to the price of the articles to be vended, means for liberating tokens from said holder, a cage in which the liberated marks are temporarily arrested for inspection, means including a rocking shaft, a slotted gate on said cage, and an arm on said shaft for operating said gate for ejecting the tokens from said cage, a chute for receiving the ejected tokens, another gate for arresting the ejected tokens at the lower end of said chute in line with an inspection opening, and a pin on said shaft for controlling said other gate, which pin is so pitched with respect to said arm as to open said other gate before the next token is ejected from said cage.

11. In a machine for the delivery of tokens to be exchanged for articles for sale, a holder for a supply of tokens related to the price of the articles to be vended, means for liberating tokens from said holder, a cage in which the liberated tokens are temporarily arrested for inspection, means in said machine for conducting the liberated tokens to said cage, a race open at one end in said cage for the reception of said tokens, a check at the open end of said race for arresting the liberated tokens, a slotted gate having means for ejecting the tokens by moving them past said check, and means for reciprocating said gate.

12. A machine for the delivery of tokens for articles, comprising a casing, a holder in the casing for a supply of tokens associated with the price of articles to be sold, means connected to the holder casing for liberating tokens from the holder, an inclined chute beneath the plate, a movable gate at the lower end of the chute for receiving the liberated tokens, said gate having a slotted opening therein, means for retaining the tokens on the gate, and means in connection with the gate for moving said gate and forcing said tokens outwardly therefrom.

13. A machine for the delivery of tokens for articles, comprising a casing, a holder in the casing for a supply of tokens associated with the price of articles to be sold, means for removing the tokens from the holder, a chute for the released tokens, a slidable gate at one end of the chute for receiving the tokens, a boss in contact with said gate, and means connected with the boss for rotating the same to actuate the gate and permit escape of the tokens.

14. In a machine for the delivery of tokens having different identifying markings, a holder for tokens, means for liberating tokens from said holder, a receptacle adapted to temporarily receive and arrest liberated tokens for inspection, means for ejecting tokens from said receptacle and means for actuating said ejecting means, said actuating means comprising a rotatable shaft, an element on the shaft cooperating with said ejecting means and mechanism for automatically returning the shaft to its initial position after rotation.

15. In a machine for the delivery of tokens with different identifying markings, a holder for tokens, means for liberating one token at a time from said holder, a receptacle adapted to receive and arrest liberated tokens, means for ejecting one token at a time from said receptacle, a second receptacle adapted to receive and arrest each token as it is ejected from said first-named receptacle, means to discharge tokens from said second receptacle and a device for actuating both the token ejecting means of the first receptacle and the token discharging means of the second receptacle.

16. A machine according to claim 15 wherein said device is adapted to actuate the discharging means of the second receptacle prior to actuating the ejecting means of the first receptacle.

17. A machine according to claim 15 wherein the means for ejecting one token at a time from said first-named receptacle is adapted to eject tokens in the order in which they are received in said receptacle, and means for ejecting tokens in the order in which they are received by the receptacle.

RICHARD MONHEIM.